Dec. 19, 1939.  E. T. WYMAN  2,183,760
PNEUMATIC TUBE
Filed Aug. 1, 1936  3 Sheets-Sheet 1

Inventor:
Edwin T. Wyman,

Dec. 19, 1939.  E. T. WYMAN  2,183,760
PNEUMATIC TUBE
Filed Aug. 1, 1936  3 Sheets-Sheet 2

Inventor:
Edwin T. Wyman

Dec. 19, 1939.  E. T. WYMAN  2,183,760

PNEUMATIC TUBE

Filed Aug. 1, 1936  3 Sheets-Sheet 3

Inventor:
Edwin T. Wyman,

Patented Dec. 19, 1939

2,183,760

UNITED STATES PATENT OFFICE 2,183,760

PNEUMATIC TUBE

Edwin T. Wyman, Boston, Mass.

Application August 1, 1936, Serial No. 93,834

7 Claims. (Cl. 152—348)

The present invention relates to inner tubes made of vulcanized rubber or the equivalent for pneumatic tires. Its object is to furnish an improved tube of the puncture sealing type, which is at the same time more effective in its puncture sealing qualities and lighter in weight than tubes of this class heretofore put on the market, is easier to install in the casing or shoe of a tire, and can be manufactured less expensively than such tubes of the prior art.

Heretofore, it has been generally believed that, to obtain the desired compression in the tread of the tube to cause it to be puncture self-sealing, the tread of the tube must be relatively much thicker than the wall or belly of the tube, and maintained in some manner under compression. This has been accomplished by the use of a restrictive fabric strip or strips on or near the outer wall of the tread, and in some cases, by making the tube initially wrong side out, then turning it, the fabric strip imparting to the tread a reverse curve, and then splicing the ends, and thus compressing the tread; or by molding the tube on a distorted mold with a built-up or thickened and materially widened tread, and perhaps with a reinforcing fabric strip, which tube is subsequently confined between and the tread compressed by the walls of the casing or shoe when the tube is inflated therein. Each of these methods, while having advantages, also has disadvantages, some of which are hereafter noted, and I have discovered a novel and superior construction, which avoids these disadvantages.

In the drawings illustrating embodiments of my novel and improved puncture sealing inner tube, hereinafter described:

Figure 3:
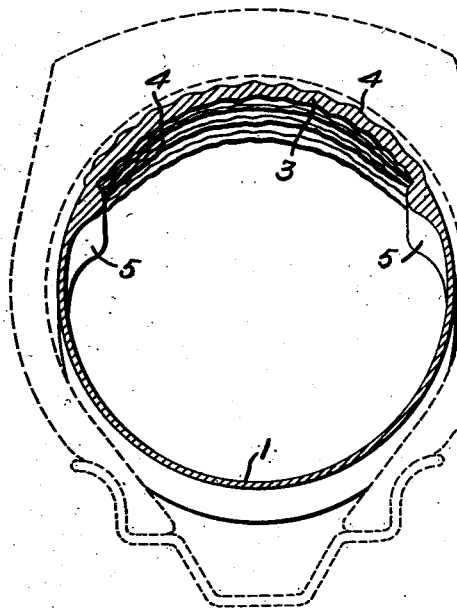
Figure 4:
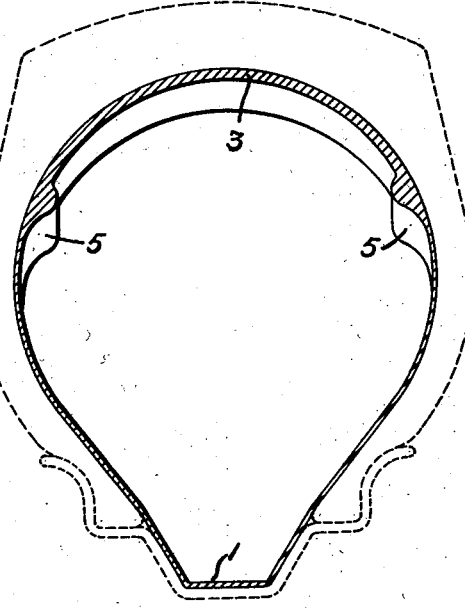
Figure 5:
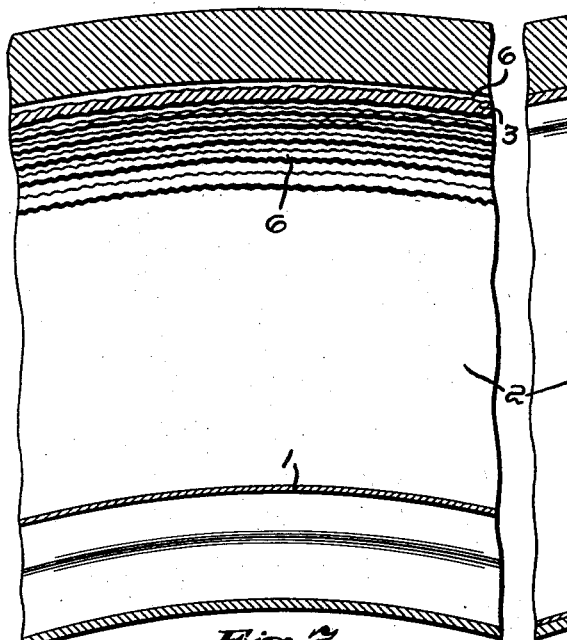

Fig. 3, a modified form of the tube uninflated;

Fig. 4, a view of the modified form, inflated;

Fig. 5, a longitudinal, sectional view of a segment of a modified form of tube, uninflated with the waves extending circumferentially across tread of the tube.

Figure 6:
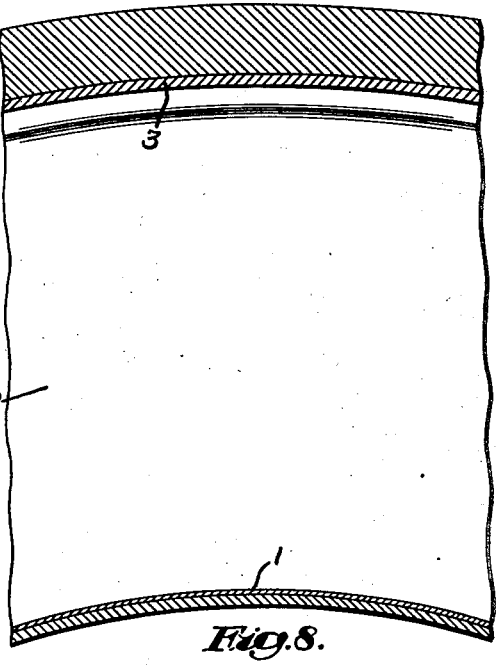
Figure 7:
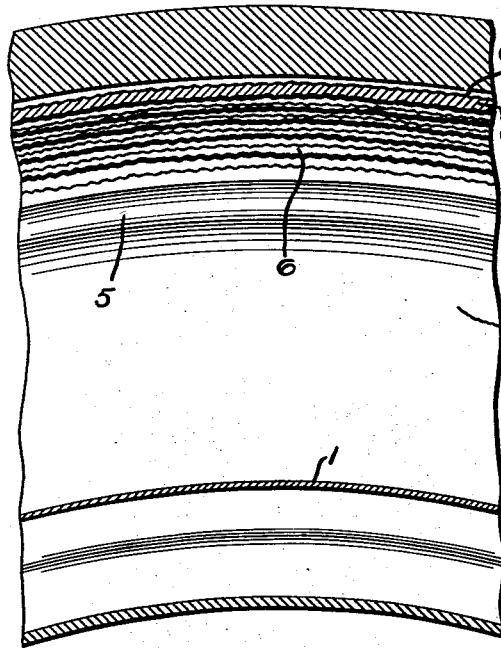
Figure 8:
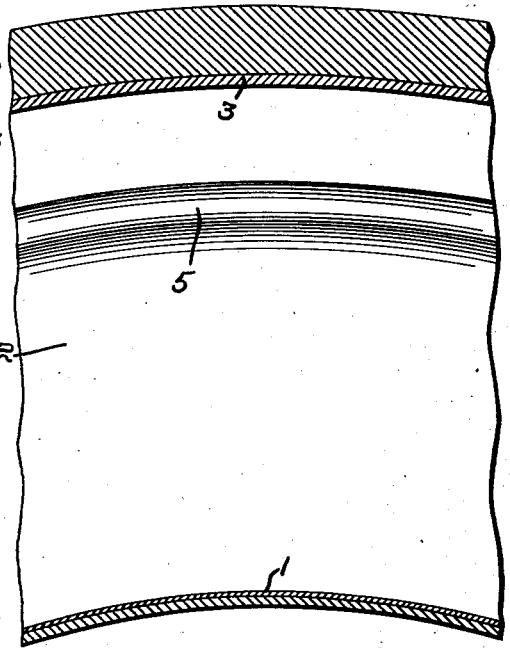
Figure 9:
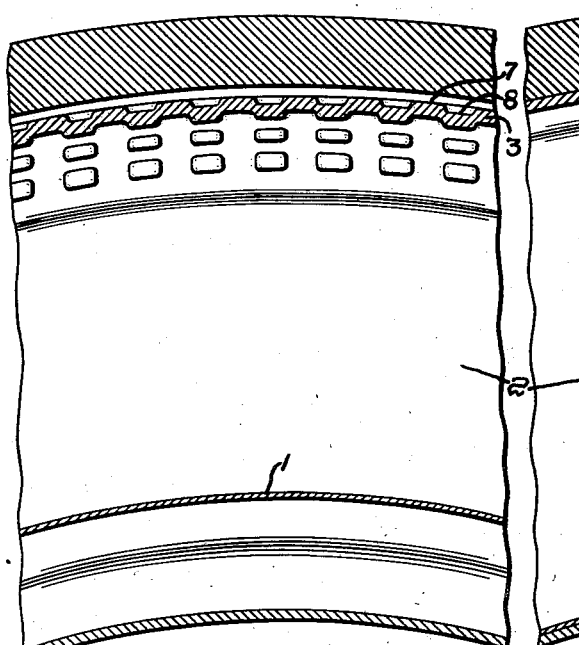
Figure 10:
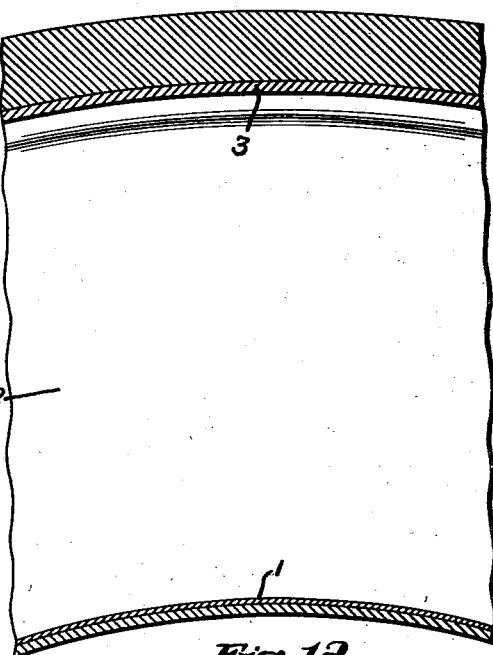
Figure 11:
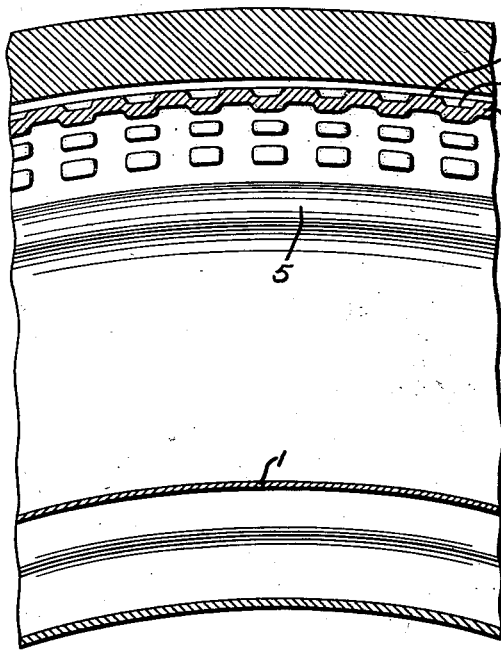

Fig. 6, a similar view of the same tube inflated;

Fig. 7, a similar view of a further modified form, including a longitudinal rib, uninflated;

Fig. 8, a similar view of this tube, inflated;

Fig. 9, a similar view of a further modified form, uninflated, with the waves extending both longitudinally around and circumferentially across the tread of the tube;

Fig. 10, the same tube, inflated;

Fig. 11, a similar view of a still further modified form, uninflated; and

Figure 12:
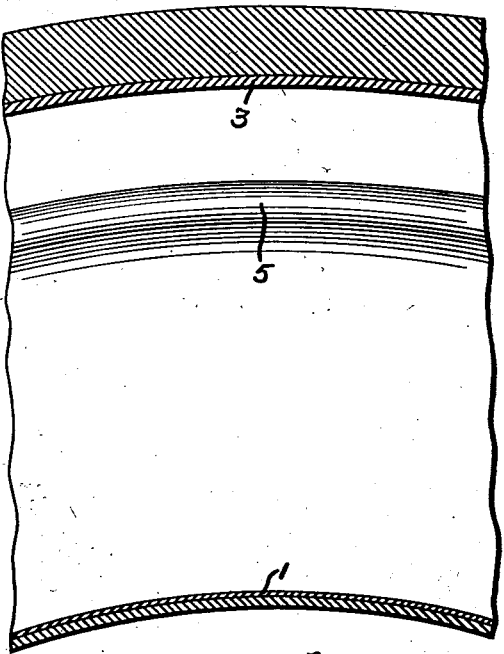

Fig. 12, the same tube, inflated.

Figure 1:
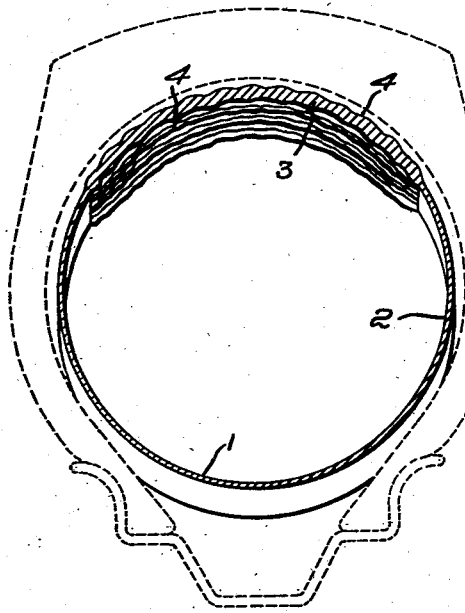
Fig. 1 is a vertical cross section of a short segment of the tube in uninflated condition shown diagrammatically in a shoe of common type, in dotted lines with the waves extending longitudinally around tread of tube.
Figure 2:
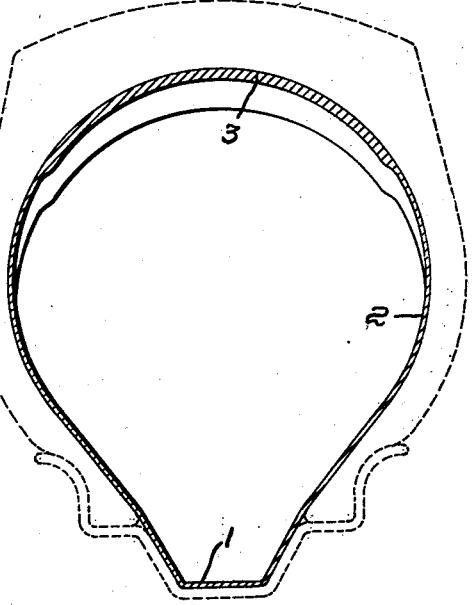
Fig. 2 shows the tube inflated in the same relation.

Referring first to Figs. 1, 2, respectively, views of uninflated and inflated tubes, my novel tube is shown as a molded, endless, vulcanized, soft rubber tube, substantially circular in cross section, or fashioned to conform to the shape of the tire or shoe. The belly 1, and side wall 2, of the tube are of desired and suitable thickness, while the tread 3 may be, and preferably is, made slightly thicker, as twice the thickness of the side wall.

Contrary to the practice of some tube manufacturers, my tube is made smaller in cross section through the belly and tread than the shoe, but with an excess of readily available material in the tread, and constructed of rubber that is particularly pliable and elastically deformable in texture. The tread 3, Figs. 1, 2, comprises a plurality of substantially parallel, waves or corrugations 4, of which the ridges and valleys extend longitudinally around the major circumference of the tube tread. As shown in the drawings, the spacing between corrugations is relatively short in proportion to the thickness of rubber in the tread, ranging from equality with, to not more than six times that thickness, and the height between the crests of the ridges and bottoms of the intermediate grooves is within four times that thickness. It is essential that the thickness of the material in the valleys of the corrugations be such as to provide stiffness to prevent any substantial or considerable shifting toward or away from one another of the corrugations, or such uncontrolled and unequal bending of their sides as would make folds, when pressed against the tire shoe by the internal air pressure. At the same time the corrugations must provide a sufficiency of surplus material to permit enlargement of the tube sufficiently to fill the cavity within the tire shoe without drawing the corrugations out flat or putting the tread under greater tension than can be over-compensated by the subsequent compression caused by the effort of the air pressure to flatten the corrugations.

The invention comprises, as one of its important characteristics, the relationship between the thickness of the tread, and the spacing and depth of the corrugations, such that, after inflation to the service pressure for which the tire is designed, the corrugations will be considerably flattened, or brought toward conformity with the smooth interior surface of the shoe, and at the same time will be put under compression in substantially equal measure throughout all parts of the tread.

Experience with tubes of the foregoing type of construction seems to prove that a reasonable surplus of soft, yieldable material, elastically deformable under usual pressure, or slightly more, will move or yield sufficiently to seal a puncture as well or better than a thick wall of rubber under excess pressure. In other words, it takes but little available material of yieldable nature to close a puncture.

Tests have proved that tubes made as above described will, when inflated in the tires for which they are provided, be so compressed throughout the tread as to prevent leakage when punctured while the puncturing object remains in the tube. It has also been demonstrated that the same characteristics even cause the edges of the puncture to be crowded so closely together as to prevent leakage after such object has been withdrawn. Essentially the same conditions exist and like actions and effects take place in the other forms of tube later described herein.

In Figs. 3, 4, is shown in uninflated and inflated form, respectively, a modified form of construction, wherein the tube is provided on its inner or outer wall with a longitudinal bead or rib 5 of rubber on each side of the tread. Such beads, being thicker than the other parts of the tube, stretch less than such other parts under any given pneumatic pressure. Hence under the inflation pressure, the beads are moved laterally by the expanding sides of the tube, and with less proportional enlargement in diameter than the intermediate tread portion of the tube, until they come into bearing against the tire shoe or casing. Thereafter they remain substantially fixed in position and serve as abutments by which the lateral boundaries of the tread portion are located and confined throughout the subsequent compression of the tread portion.

In Figs. 5, 6, I have shown also in uninflated and inflated form a further modified form, wherein the ridges or rubber waves 6 run circumferentially across the tread of the tube, and are equally satisfactory as providing puncture sealing material.

In Figs. 7, 8, I have shown uninflated and inflated views of a further modified form, wherein the tube tread wall area is provided with a longitudinal rib 5 at its edge for the same purpose as described above.

In Figs. 9 to 12, a further modified form is shown, where the tube is provided with a tread area having the parallel waves or undulations 7 running both longitudinally around and circumferentially across the tread, leaving valleys 8 between them with the same self-sealing function under pressure on the tread, as described.

Tubes made as illustrated in Figs. 1 to 8 can readily be repaired in the usual way, while, if made as shown in the manner shown in Figs. 9 to 12, they are not so easy to repair, if necessary, but it is possible.

My novel tube has many advantages. Experience has shown that tubes with compressed treads, made by reversing, through inflation, the curvature of a strongly concave tread wall, suffer, in time, from the effect of the excessive amount of pressure and stretching required to effect and maintain the reversal of the tread, as it reacts to destroy the natural, inherent, self-sealing action of the rubber to close a puncture with but little, if any, assistance.

On the other hand, the practice of relying upon the side walls of the shoe to compress to a desired size the tread and shoulders of an abnormally wide tread on the inner tube to obtain compression, is open to the same objection. The side walls of the tube, with their ribs 5, in my construction, move outwardly on compression, and not inwardly.

Inner tubes with very thick and broad treads are very expensive to build, require a large quantity of rubber, are very heavy and hard to handle and ship, and, under modern driving conditions, with high speed motors, likely to overheat and be damaged, and are very difficult and expensive to repair. If the fabric strip is used to promote compression, it adds to the difficulty of making repairs. The fabric also constantly exerts a severe strain in reversed inner tubes, tending to cause separation of the strip from the rubber, and breaking of the tube wall.

My novel tube can be built more cheaply than the reversed tread tube. It is not liable to the danger of becoming too greatly heated in use, is lighter to handle, and does not suffer the strains created in a thick tread of a tube which is turned inside out and of which the natural resilience is thereby impaired. The thinner the tube, the more responsive it is to the inflation pressure; wherefore the surplus rubber provided in the tread portion of my tube is determined by the inflation pressure which the tube is designed to sustain in use, and is such that, when inflated, the tube will present a substantially smooth surface to the inside of the tire shoe.

Furthermore, my novel tube can be built substantially with the present molds, it being only necessary to add the longitudinal or transverse, or both if desired, waves and groves to the conventional mold.

It is apparent from the foregoing description and drawings that tubes containing this invention are adapted to be made with the same relationship or ratios between their dimensions when undistended and the inner walls of the tire casings or shoes with which they are intended to be used, as in the standard or commonly accepted practice; and that the thickness of the rubber may be of any amount known to be serviceable for tubes built to meet different conditions of use. For instance, the sides and belly of the tube may have the same thickness as corresponding parts of standard tubes of corresponding sizes, and the tread have a greater thickness. Or the tread may have a thickness equal to standard and the sides and belly be thinner; or the tread may be somewhat thicker and the other parts somewhat thinner than the thickness of corresponding standard tubes. Whatever the exact thicknesses of these parts may be, the relatively greater thickness of the tread is a useful and important characteristic, even if not an essential one. It causes the greater part of the initial expansion of the tube in filling the shoe to be imparted to the sides and belly, and these parts to be brought into frictional engagement with the shoe before the tread is stretched materially. Thereby the tread is anchored and confined in the shoe not only in cases where the beads 5 are not provided, but in other cases also.

My invention is not limited to the precise construction shown herein, but may be modified in many details, without departing from the spirit of the invention, and within the scope of the claims.

The terms "rubber" and "vulcanized rubber" are used in this specification and in the following claims with a generic descriptive significance and are to be construed as embracing not only natural rubber and compositions containing natural rubber, but also all usable rubber substitutes, such as the so called synthetic rubbers, which have many of the qualities of, and other desirable qualities not possessed by, natural rubber.

I claim:

1. A puncture self-sealing, endless, vulcanized rubber, pneumatic tube, smaller when in its undistended condition than the cavity of the tire shoe with which it is designed to be used, and having a tread portion formed with waves extending both longitudinally and transversely of said tread portion; which tread portion, on inflation of the tube to the normal service pressure, is pressed against the inner wall of the tire casing causing the waves to substantially disappear and creating intersecting diagonal or semi-radial compression stresses throughout the mass of elastically deformable material acting against a puncturing object.

2. A pneumatic tube as set forth in claim 1 and including in its construction relatively non-distensible elastic beads at the opposite boundaries of the tread portion, adapted to abut on the inside of the tire shoe when the tube is inflated and locate the bead in a definite predetermined position.

3. A puncture sealing inner tube for pneumatic tires made of elastic and readily deformable tire material having a tread portion formed with waves or corrugations, and having relatively non-distensible elastic beads at the opposite boundaries of the tread portion, said tube being of smaller dimensions in transverse section than the cavity of the tire shoe with which it is designed to be used.

4. An inner tube for pneumatic tires made of elastic and readily deformable tire material, having a corrugated tread, in which the corrugations are spaced apart from one another by distances between corresponding points less than six times the thickness of the tread material and the height between ridges and valleys of the corrugations is less than such spacing, whereby said tread, when distended by pneumatic pressure within the tube to an extent less than sufficient to obliterate the corrugations, and forced by such pressure against a confining wall, is forced toward conformity with such confining wall, with compression of the material in all of the corrugations and without substantial change from the original spacing between the chests of the corrugations.

5. An inner tube as set forth in claim 4, in which the corrugations extend transversely of the tread.

6. An inner tube as set forth in claim 4, in which the corrugations extend longitudinally of the tread.

7. An inner tube as set forth in claim 4, constructed with relatively non-distensible beads at the lateral boundaries of the tread.

EDWIN T. WYMAN.

CERTIFICATE OF CORRECTION.

Patent No. 2,183,760. December 19, 1939.

EDWIN T. WYMAN.

It is hereby certified that error appears in the printed specification of the above numbered patent requiring correction as follows: Page 3, second column, line 23, claim 4, for "chests" read crests; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.